(12) United States Patent
Tanaka et al.

(10) Patent No.: US 7,599,773 B2
(45) Date of Patent: Oct. 6, 2009

(54) PARKING ASSIST DEVICE

(75) Inventors: Yuu Tanaka, Aichi-ken (JP); Yoshifumi Iwata, Aichi-ken (JP); Hideyuki Iwakiri, Tajimi (JP); Hisashi Satonaka, Susono (JP); Yuichi Kubota, Okazaki (JP); Tomohiko Endo, Toyota (JP); Akira Matsui, Toyota (JP); Toru Sugiyama, Toyota (JP); Seiji Kawakami, Susono (JP); Katsuhiko Iwazaki, Shizuoka (JP); Hiroaki Kataoka, Susono (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 157 days.

(21) Appl. No.: 10/928,256

(22) Filed: Aug. 30, 2004

(65) Prior Publication Data

US 2005/0060073 A1 Mar. 17, 2005

(30) Foreign Application Priority Data

Aug. 29, 2003 (JP) ............................. 2003-209745

(51) Int. Cl.
*G06K 9/32* (2006.01)
*G08G 1/14* (2006.01)

(52) U.S. Cl. ..................... 701/36; 340/932.2; 382/296

(58) Field of Classification Search ................... 701/36; 180/204; 340/932.2; 382/295, 296, 297; 348/333.02, 136, 116; *G06K 9/32; G08G 1/14*
See application file for complete search history.

(56) References Cited

U.S. PATENT DOCUMENTS

| | | | |
|---|---|---|---|
| 6,483,442 B2 * | 11/2002 | Shimizu et al. .......... 340/932.2 |
| 6,587,760 B2 * | 7/2003 | Okamoto ....................... 701/1 |
| 6,597,817 B1 * | 7/2003 | Silverbrook ................ 382/289 |
| 6,621,421 B2 * | 9/2003 | Kuriya et al. ............. 340/932.2 |
| 6,633,675 B1 * | 10/2003 | Abe ........................... 382/232 |
| 6,654,670 B2 * | 11/2003 | Kakinami et al. .............. 701/1 |
| 6,711,473 B2 * | 3/2004 | Shimazaki et al. ............. 701/1 |
| 6,825,880 B2 * | 11/2004 | Asahi et al. ............ 348/333.02 |
| 6,888,953 B2 * | 5/2005 | Hanawa ..................... 382/104 |
| 6,999,002 B2 * | 2/2006 | Mizusawa et al. ........ 340/932.2 |
| 7,065,249 B2 * | 6/2006 | Fushiki et al. .............. 382/167 |
| 7,433,537 B2 * | 10/2008 | Sasada ....................... 382/275 |
| 2003/0080877 A1 * | 5/2003 | Takagi et al. ............. 340/932.2 |
| 2003/0150661 A1 * | 8/2003 | Kataoka et al. ............. 180/204 |
| 2004/0119610 A1 * | 6/2004 | Maemura et al. ......... 340/932.2 |

FOREIGN PATENT DOCUMENTS

EP 1 297 999 A 4/2003

(Continued)

*Primary Examiner*—Tuan C To
(74) *Attorney, Agent, or Firm*—Sughrue Mion, PLLC

(57) ABSTRACT

A parking assist device for assisting parking operation to a target parking position includes an initial position setting device for setting an initial position of the target parking position to park a vehicle, a designation display showing the target parking position, a display position calculation device for calculating an initial display position of the designation display showing the target parking position at a screen showing vehicle surroundings based on the initial position determined by the initial position setting device, and an initial display position shifting device for shifting the initial display position of the designation display to a position within a display range on the screen in case the initial display position calculated by the display position calculation device is positioned outside of the display range on the screen.

2 Claims, 9 Drawing Sheets

FOREIGN PATENT DOCUMENTS

| | | |
|---|---|---|
| EP | 1 332 948 A | 8/2003 |
| EP | 1 510 440 A | 3/2005 |
| JP | 07-229961 A | 8/1995 |
| JP | 11-208420 A2 | 8/1999 |
| JP | 2000-118334 A | 4/2000 |
| JP | 2003-011762 A | 1/2003 |
| JP | 2003-063337 A | 3/2003 |
| JP | 2003-205807 A | 7/2003 |

* cited by examiner

PARKING ASSIST DEVICE

CROSS REFERENCE TO RELATED APPLICATIONS

This application is based on and claims priority under 35 U.S.C. §119 with respect to Japanese Patent Application No. 2003-209745 filed on Aug. 29, 2003, the entire content of which is incorporated herein by reference.

FIELD OF THE INVENTION

The present invention relates to a parking assist device. More particularly, the present invention pertains to a parking assist device, which determines a target parking position to park a vehicle, and leads the vehicle to the target parking position.

BACKGROUND

A known parking assist device described in Japanese Patent Laid-Open Publication No. JP11 (1999)-208420A2 displays a target parking position designation display so that an operator designates a target parking position of a vehicle on a screen showing an image of vehicle surroundings by a positional operation of the target parking position designation display on the screen. With the known parking assist device described in Japanese Patent Laid-Open Publication No. JP11 (1999)-208420A2, in case the designated path to the target parking position is generated by the calculation, the vehicle is led to the target parking position along the generated path.

An initial display position of the target parking position designation display on the screen may always be determined at a predetermined default position in accordance with an initial position of the target parking position being a predetermined relative positional relationship relative to an initial position of the vehicle or may be arbitrarily determined by determining a predetermined relative position relative to a vehicle position at a time before the initial display as an initial position of the target parking position based on the traveling history of the vehicle. In case the initial display position of the target parking position designation display is determined arbitrarily, the initial display position may be positioned outside a display range of the screen. In this case, provided that the initial display position is not to be displayed on the screen, the operators is required to conduct the positional operation in order to view the target parking position designation display on the screen although the operator cannot see the target parking position designation display on the screen, which makes it difficult to designate the target parking position and requires longer time for designating the target parking position.

A need thus exists for a parking assist device which enables an operator to designate a target parking position to park a vehicle with less complication.

SUMMARY OF THE INVENTION

In light of the foregoing, the present invention provides a parking assist device for assisting parking operation to a target parking position, which includes an initial position setting means for setting an initial position of the target parking position to park a vehicle, a designation display showing the target parking position, a display position calculation means for calculating an initial display position of the designation display showing the target parking position at a screen showing vehicle surroundings based on the initial position determined by the initial position setting means, and an initial display position shifting means for shifting the initial display position of the designation display to a position within a display range on the screen in case the initial display position calculated by the display position calculation means is positioned outside of the display range on the screen.

According to another aspect of the present invention, a parking assist device for assisting parking operation to a target parking position includes an initial position setting means for setting an initial position of the target parking position to park a vehicle, a designation display showing the target parking position, a display position calculation means for calculating an initial display position of the designation display showing the target parking position at a screen showing vehicle surroundings based on the initial position determined by the initial position setting means, and a calculated position limiting means for limiting the initial display position calculated by the display position calculation means to be within a display range of the screen.

According to further aspect of the present invention, a parking assist device which starts to assist parking operation after confirming a target parking position, which includes a target parking position setting means for setting the target parking position to park a vehicle, a designation display showing the target parking position, a display position calculation means for calculating a display position of the designation display showing the target parking position at a screen showing vehicle surroundings based on the target parking position determined by the target parking position setting means, and a display position movement limiting means for limiting positional movement of the designation display so as not to position the display position calculated by the display position calculation means outside of a display range of the screen upon relative movement between a position of a vehicle and the target parking position determined by the target parking position setting means before starting to assist the parking operation by confirming the setting of the target parking position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
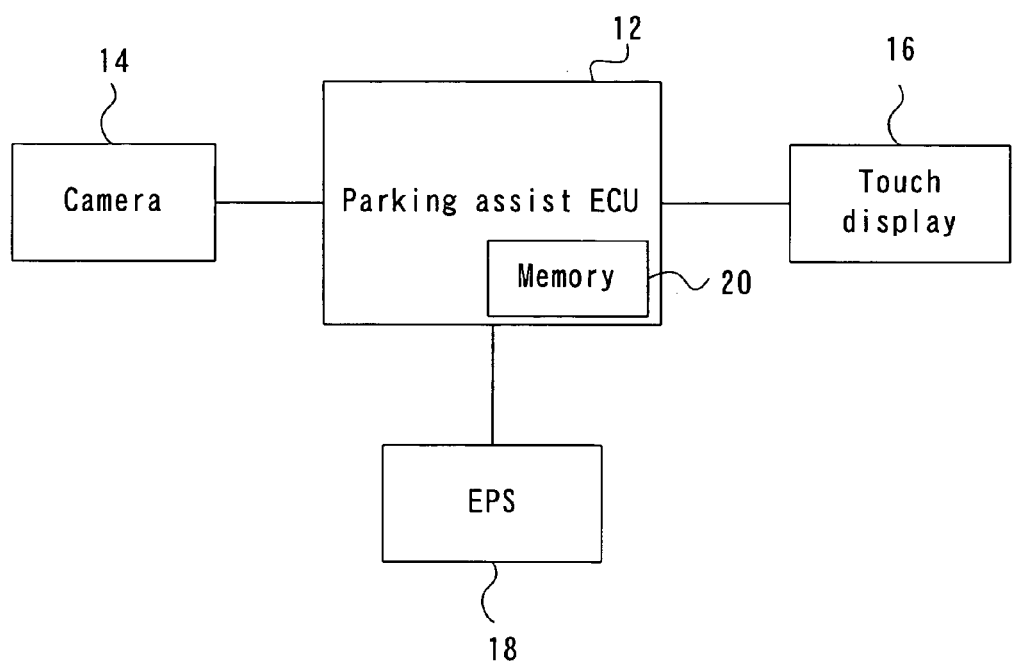
FIG. 1 is a system diagram of a parking assist device boarded on a vehicle according to an embodiment of the present invention.

One embodiment of the present invention will be explained with reference to the illustrations of the drawing figures as follows.

A parking assist device 10 shown in FIG. 1 is configured to automatically carry out the vehicle steering so that the vehicle assumes in motion along a path to a target parking position where the vehicle is to be parked on a road surface without the manual steering operation by an operator when parking the vehicle such as at the back-in parking and the parallel parking. The leading control to the target parking position by the parking assist device 10 is refereed as a parking assist control hereinafter.

As shown in FIG. 1, the parking assist device 10 includes parking assist electronic control unit (i.e., referred as a parking assist ECU hereinafter) 12 for controlling the parking assist device 10. The parking assist ECU 12 is connected with a camera 14. The camera 14 is positioned in the central rear portion of the vehicle to capture an image of the region extended in a predetermined range rearward of the vehicle. The image information of the vehicle rearward surroundings captured by the camera 14 is supplied to the parking assist ECU 12.

The parking assist ECU 12 is connected with a touch display 16. The touch display 16 is provided at a position where the vehicle operator can see and operate (e.g., the center of an instrumental panel). The parking assist ECU 12 sends the command so that the actual image captured by the camera 14 is displayed on the touch display 16, for example, in case the vehicle shifts position is at the reverse position. The touch display 16 shows the vehicle rearward surroundings captured by the camera 14 on the screen following the command of the parking assist ECU 12. The touch display 16 displays additional lines and frames, or the like, for the parking assist control overlapping on the actual image captured by the camera 14 following the command of the parking assist ECU 12.

The touch display 16 includes a touch operation portion constructed as pressure sensitive type or temperature sensitive type, or the like, to be operable by the vehicle operator. The touch operation portion includes plural hierarchical switches which are displayed on the screen following the command from the parking assist ECU 12. The parking assist ECU 12 detects the operation of the touch operation portion by the vehicle operator to carry out the transaction in accordance with the contents of the selected operation. The touch operation portion includes a switch for staring the back-in parking mode for the parking assist control, a switch for starting the parallel parking mode for the parking assist control, and arrow button switches for designating the target parking position to park the vehicle, or the like.

The parking assist ECU 12 is connected to an electric power steering device (i.e., hereinafter referred as EPS) 18. The EPS 18 includes a torque sensor for detecting a steering torque applied to a steering shaft by the steering operation by the vehicle operator, a steering angle sensor for detecting the steering angle of the steering shaft, and an electric motor for applying torque to the steering shaft. The EPS 18 makes the electric motor generate the torque to assist the steering torque at the steering operation by the operator and also makes the electric motor generate the torque to steer the vehicle without accompanying the steering operation by the operator when parking the vehicle such as at the back-in parking and the parallel parking, or the like, in accordance with the parking assist control.

The EPS 18 supplies the detected steering angle information of the steering shaft to the parking assist ECU 12. The parking assist ECU 12 supplies a target steering angle which is to be achieved by the steering shaft at the parking assist control to the EPS 18. The EPS 18 makes the electric motor generate the torque for the parking assist control referring to the target steering angle supplied from the parking assist ECU 12.

The parking assist ECU 12 includes a memory 20 configured to read and write the data. The memory 20 memorizes the positional information of the road surface (i.e., on the absolute coordinate) of the target parking position determined by the positional determination by the operator and the path information of the path to the target parking position generated by the calculation. The information stored in the memory 20 is deleted when the parking assist control is completed such as when the shift position is transited from the reverse position to the parking position, or the neutral position, or the like, and when the vehicle approaches approximate to the target parking position, or the like.

The operation of the parking assist device 10 will be explained as follows.

According to the embodiment of the present invention, first, the operator stops the vehicle at a position ensuring a predetermined distance relative to the target parking position to park the vehicle with the steering angle at the neutral positional, state (i.e., zero steering angle). When the shift position of the vehicle is transited to the reverse position with the foregoing state, the vehicle rearward surroundings captured by the camera 14 is shown on the screen of the touch display 16 either automatically or when the a predetermined switch for requesting the parking assist by the parking assist control is ON. In this case, a switch for starting the back-in parking starting mode and the switch for starting the parallel parking mode for the parking assist control are appeared on the screen (i.e., initial screen image).

When the back-in parking mode switch is operated in the foregoing state, a frame (hereinafter referred as parking space frame) S showing the target parking position where the vehicle is to be parked by the back-in parking on the road surface and arrow button switch C configured to be moved and rotated for adjusting the target parking position on the road surface are displayed overlapping on the vehicle rearward surroundings captured by the camera 14 on the screen of the touch display 16 (i.e., setting screen image).

In this case, the arrow button switch C includes an upward switch for moving the target parking position further on the road surface relative to the own vehicle, a downward switch for moving the target parking position to the nearer relative to the own vehicle, a leftward switch for moving the target parking position to the left relative to the own vehicle, a rightward switch for moving the target parking position to the right relative to the own vehicle, a counterclockwise switch for rotating the target parking position counterclockwise relative to the own vehicle, and a clockwise switch for rotating the target parking position clockwise relative to the own vehicle. With the foregoing construction, the target parking position is movable in arbitrary four directions and rotatable about the center via the positional operation on the screen of the parking space frame S.

When the parallel parking mode switch is operated on the screen of the touch display 16, the parking space frame S showing the target parking position where the vehicle is to be parked on the road surface by the parallel parking and the arrow button switch C for moving the target parking position on the road surface are displayed overlapping on the vehicle rearward surroundings captured by the camera 14 on the screen of the touch display 16 (i.e., setting screen image).

In this case, the upward switch, the downward switch, the leftward switch, and the rightward switch are appeared as the arrow button switch C. In the meantime, the counterclockwise switch and the clockwise switch are not appeared. With the foregoing construction, although the target parking position is arbitrarily movable in the four directions by the positional operation of the parking space frame S on the screen to move in the back-and-forth directions and the vehicle width directions, the target parking position does not rotate about the center.

The parking space frame S corresponds to the target parking position on the actual road surface, thus the parking space frame S is configured to be rectangular having the approximately the same size with the vehicle size provided that the parking space frame S is projected on the actual road surface. However, on the screen of the touch display 16, the parking space frame S is configured to have the configuration corresponding to the position on the vehicle rearward image (i.e., on the camera coordinate) captured by the camera 14 shown on the screen.

When the arrow button switch C is operated by the operator, the target parking position moves by X cm (e.g., 5 cm) on the actual road surface, rotates by Y degrees (e.g., 1 degree) per a touch to displace the parking space frame S on the screen of the touch display 16. Closer the target parking position relative to the vehicle, the larger the moving amount of the parking space frame S on the screen of the touch display 16 considering the distance relationship on the vehicle rear image captured by the camera 14.

After the parking space frame S and the arrow button switch C are displayed on the screen of the touch display 16, the calculation of the path from the current vehicle position at the time serving as the leading starting position to the target parking position following the operational position of the parking space frame S is conducted every predetermined time (e.g., 2 ms).

Figure 2A:
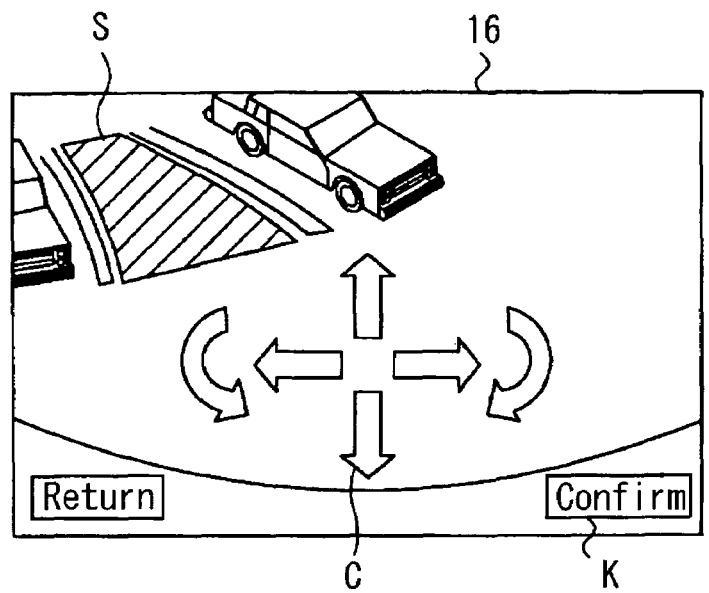
FIGS. 2A-2B show images shown on a screen at a setting of a target parking position with the parking assist device according to the embodiment of the present invention.
Figure 2B:
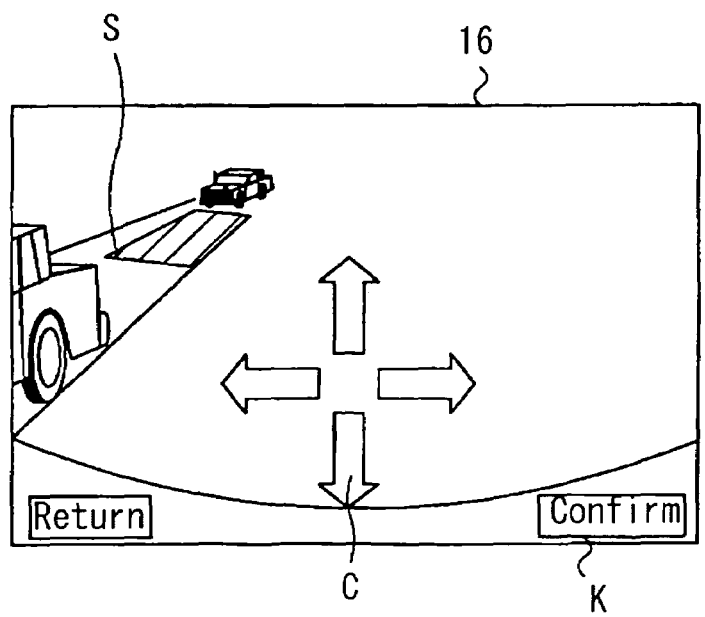

When the back-in parking mode switch or the parallel parking mode switch is operated, a confirmation button switch K for confirming the setting of the target parking position is overlapped on the screen along with the parking space frame S and the arrow button switch C as shown in FIGS. 2A-2B. When the confirmation buttons switch K is operated at the state that the path to the target parking position is generated by the calculation, the designation of the target parking position is confirmed, thus to allow the automatic steering operation by the parking assist control thereafter.

Figure 3:
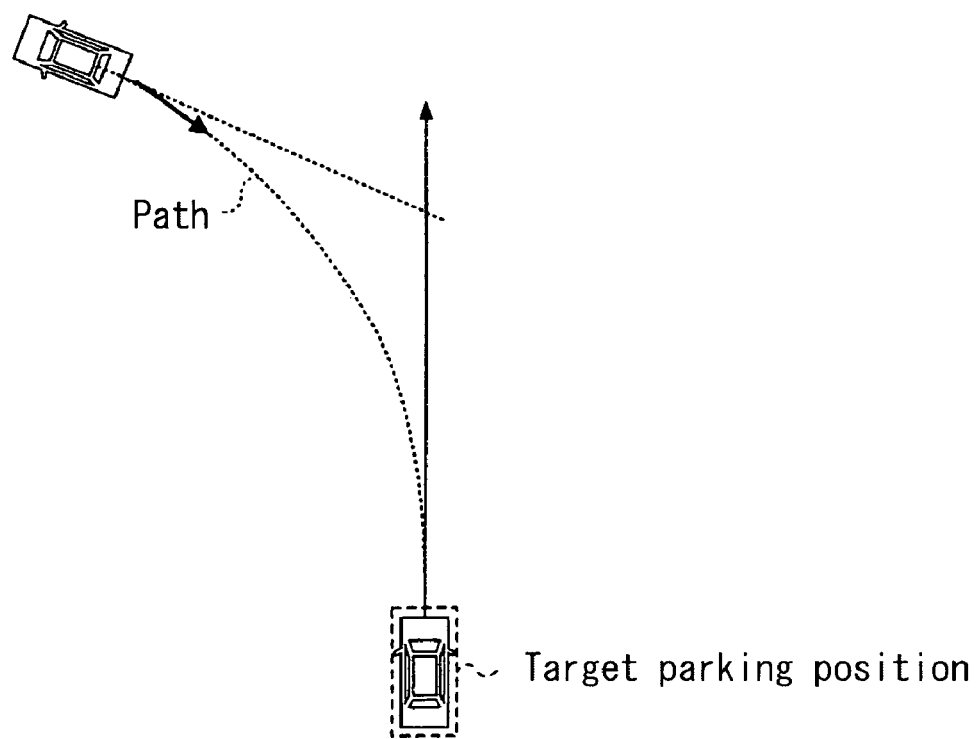
FIG. 3 shows a path to the target parking position at back-in parking according to the embodiment of the present invention.

As shown in FIG. 3, with the back-in parking mode, the calculation of the path to the target parking position at the initial designation is conducted based on a relative positional relationship between the current position of the own vehicle and the target parking position when a predetermined geometric positional condition determined by the relative positional relationships between the current position of the own vehicle and the target parking position and a minimum turning radius of the own vehicle is satisfied so that the following each interval is appropriately formed in the following order:

1. Straight reversing interval of a predetermined distance; 2. Increasing steering angle interval; 3. Interval with the fixed steering angle; 4. Decreasing steering angle interval; and 5. Straight reversing interval by a predetermined distance.

Figure 4:
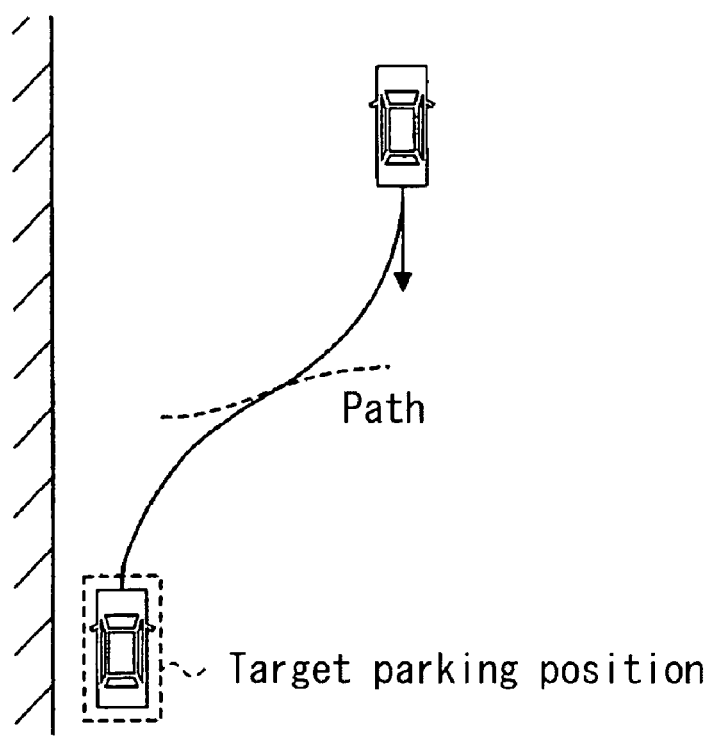
FIG. 4 shows a path to the target parking position at parallel parking according to the embodiment of the present invention.

As shown in FIG. 4, with the parallel parking, when predetermined geometric positional conditions defined by a minimum turning radius of the own vehicle and a relative positional relationship between the current position of the own vehicle and the target parking position are satisfied, the calculation of the path to the target parking position at the initial designation is conducted based on the relative positional relationship so that two imaginary circles part of them serving as the path are to be tangent to each other.

When the path to the target parking position is calculated at the back-in parking mode and the parallel parking mode to effectively generate the path, the inside of the parking space frame S is colored, for example, in green to show that the parking assist control can be performed on the touch display 16. When the effective path to the target parking position is generated by the calculation and the confirmation button switch K on the touch display 16 is operated with the green colored parking space frame S, the target parking position information and the path information are stored in the memory 20, and the arrow button switch C and the confirmation switch K disappear.

On the other hand, in case the effective path to the target parking position is not generated by the calculation because the relative position between the vehicle and the target parking position does not satisfy the predetermined relationship, or the like, the inside of the parking space frame S is colored, for example, in red to show that the parking assist control cannot be performed and the arrow button switch C and the confirmation button switch K are maintained to be displayed to urge the change of the target parking position or the leading starting position.

When the vehicle starts to be in reverse motion due to the creep, or the like, by releasing the braking operation at the state that effective path to the target parking position is generated and the designation of the target parking position is completed by the operation of the confirmation button switch K on the touch display 16, the parking assist control for leading the vehicle to the target parking position starts thereafter. Particularly, the vehicle moving amount from the leading starting position relative to the road surface is calculated, the vehicle position relative to the path to the generated target parking position is calculated based on the calculated vehicle moving amount and the steering angle information from the EPS 18, and the target steering angle for moving the vehicle along the generated path is calculated. The calculated target steering angle is supplied to the EPS 18. The EPS 18 makes the electric motor generate the torque for rotating the steering shaft to move the vehicle along the generated path based on the target steering angle from the parking assist ECU 12.

With the construction of the embodiment of the present invention, the parking assist control can be carried out for automatically operating the vehicle along the predetermined path to the target parking position determined by the operation of the vehicle operator at the back-in parking or at the parallel parking. Once the foregoing parking assist control is carried out, it is not required for the operator to conduct the steering operation. Thus, with the parking assist device 10, the burden of the operator for the steering operation can be reduced at the back-in parking and at the parallel parking.

When the effective path to the target parking position is generated and when the vehicle reverses at the state that the designation of the target parking position is completed, the moving amount of the vehicle is calculated and a cancel button switch for canceling the parking assist control to the target parking position and a change button switch for achieving the resetting of the target parking position, in other words, the change of the vehicle target parking position from the position designated when the button is pressed to another position are displayed on the screen of the touch display 16. It is preferable that the change button switch effectively functions when the vehicle is at the stopped state.

In case the change button switch is not operated, the parking assist control following the target parking position information and the path information stored in the memory 20 is carried out. On the other hand, in case the change button switch is operated, the setting screen as shown in FIG. 2 reappears on the screen of the touch display 16 to show the arrow button switch C, the parking space frame S without color, and the confirmation button switch K. When the foregoing state is achieved, the path to the target parking position is calculated per predetermined time again following the operational position of the parking space frame S from the initial position defined as the leading starting position at the current position of the vehicle at the time.

The calculation of the path to the target parking position at the re-designation is conducted base on the relative positional relationship among the steering angle at the re-designation, the current position, and the target parking position when the conditions different from the condition at the path calculation at the initial designation is satisfied. Thereafter, likewise at the initial designation, the transaction in accordance with the availability of the path generation is conducted. Thereafter, the transaction is carried out likewise every time the change button switch is operated.

When the cancel button switch is operated, the parking assist control to the target parking position designated at the time is canceled to cancel the leading guide of the vehicle. Further, in case the disturbance relative to the parking assist control, such as the intervening operation conducted by the steering operation by the operator, the vehicle speed exceeding a predetermined speed, and the operation of the parking brake during the parking assist control after the start of the leading guide of the vehicle, is generated, the parking assist control is canceled to cancel the leading guide of the vehicle to ensure the safety during the leading and to securely lead the vehicle along the locus of the generated path.

Accordingly, in case the foregoing cancellation conditions are established during the leading guide of the vehicle by the parking assist control, the actual leading guide is canceled, and the positional information of the target parking position corresponding to the absolute position relative to the road surface where the vehicle is to be parked by the parking assist control is continued to be stored in the memory 20 thereafter. After the establishment of the foregoing cancellation conditions, the path to the target parking position is calculated based on the positional relationship between the vehicle position on the road surface and the target parking position whose information is continued to be stored in the memory 20.

In case the path is not generated accordingly, the initial screen with the switches for selecting the back-in parking mode and the parallel parking mode is displayed on the touch display 16. In this case, the parking assist control for conducting the leading guide to the re-designated target parking position is carried out by the operator conducting the transaction likewise at the initial designation of the target parking position.

On the other hand, in case the path is generated by the calculation, the setting screen for the back-in parking or the parallel parking with the parking space frame S, the arrow button switch C, and the confirmation button switch K, as shown in FIG. 2, automatically appears on the screen of the touch display 16. In this case, the position where the parking space frame S initially appears precisely corresponds to the position of the target parking position on the road surface whose information is maintained to be stored in the memory 20 after the cancellation of the leading guide (i.e., corresponds to the absolute position). Thereafter, when the target parking position is moved in accordance with the positional operation of the parking space frame S as necessary and the confirmation switch K is operated, the parking assist control for conducting the leading guide to the re-designated target parking position is carried out.

With the foregoing construction, the absolute positional information of the target parking position on the road surface can be read out from the memory 20 even after the cancellation of the leading guide due to the intervening steering operation and the over speed, or the like, during the leading guide of the vehicle by the parking assist control, and in case the path to the read out target parking position is generated by the calculation to be found, the re-designation of the target parking position identical to the target parking position whose leading guide was canceled can be conducted with a simple operation without conducting the positional designation of the target parking position starting from the initial screen. Thus, even after the leading guide is canceled during the leading guide of the vehicle by the parking assist control, the re-leading of the vehicle to the absolute position precisely corresponding to the cancelled target parking position by the cancellation of the leading guide can be achieved by carrying out the parking assist control with a simple operation.

The positional information of the target parking position stored in the memory 20 may be deleted upon the confirmation of the re-designation of the target parking position, that is, upon the operation of the confirmation switch K after another target parking position is set at the setting screen, and may be maintained to be stored until confirming the re-designation. The timing for deleting the positional information is not limited to upon the operation of the confirmation button switch K, and the positional information may be deleted when a predetermined operation is conducted thereafter or may be deleted when a predetermined deletion operation is conducted after showing the parking space frame S showing the target parking position on the screen of the touch display 16.

In case the path to the target parking position is generated by the calculation to be found after the cancellation of the leading guide by the parking assist control, the screen of the touch display 16 transits to the setting screen, for example, as shown in FIG. 2 rather than the initial screen. Although the setting screen shown in FIG. 2 appears when a predetermined operation is conducted by the operator at the initial screen in the normal operation, the setting screen appears without going through the initial screen with the foregoing construction. Thus, with the parking assist device 10, the operational burden of the operator is reduced at the re-designation of the target parking position.

Particularly, the parking space frame S at the transited setting screen initially appears at the position corresponding to the target parking position whose leading guide was canceled. In this case, by operating the confirmation button switch K without displacing the parking space frame S at the transited setting screen, the vehicle can be re-led to the absolute position precisely corresponding to the target parking position whose leading guide was canceled. Thus, the re-designation of the target parking position whose leading guide was canceled as the target parking position is achieved with a simple operation, which reduces the operational burden of the operator for the re-designation.

With the parking assist device 10, the setting and the designation of the target parking position is conducted by the operator adjusting the displacement of the parking space frame S which is initially displayed on the screen of the touch display 16 for showing the target parking position before the parking assist control is carried out on the screen as necessary. Thus, provided that the parking space frame S is initially displayed on the position on the screen corresponding to the target parking position on the actual road surface from the beginning, the necessity for adjusting the displacement of the parking space frame S to the desired parking position is reduced or the adjusting the displacement of the parking space frame S to the desired parking position is not required, which reduces the transaction for designating the target parking position and thus the time for parking assist control is shortened.

Figure 5:
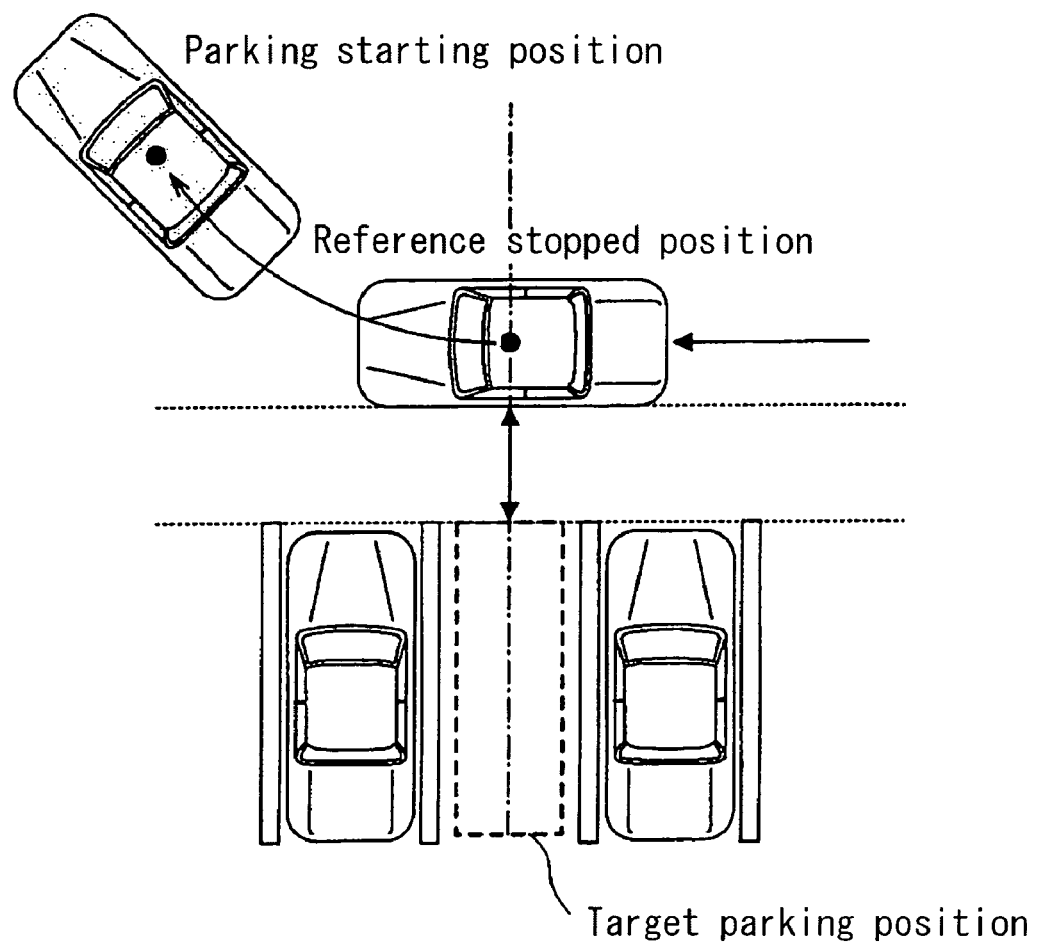
FIG. 5 is an explanatory view for a setting method of an initial position of the target parking position at the back-in parking.

A method for setting the initial position of the target parking position at the back-in parking will be explained with reference to FIG. 5. As shown in FIG. 5, the operator operates the vehicle to be approximate to and perpendicular to the target parking position where the vehicle is to be parked (i.e., the region surrounded with a dotted line of FIG. 5) and temporarily stops the vehicle around the central portion of the parking position (i.e., shown with a chain dotted line of FIG. 5). In this case, the position for the temporary stop is determined by adjusting a particular position of the vehicle of the rear wheel shaft and the position of the operator in the vehicle, or the like, to an extension line of the center line (i.e., the chain dotted line of FIG. 5) of the desired parking position.

The parking assist ECU 12 sets the initial position of the target parking position to park the vehicle arranged being perpendicular to the side of the vehicle keeping a predetermined distance from the vehicle position at the temporarily stopped state (i.e., the reference stopped position) when the it is detected that a predetermined switch for requesting the parking assist by the parking assist control is ON state or when it is detected that the vehicle steering angle at the temporarily stopped state is within a predetermined range around a neutral state when the temporarily stopped state of the vehicle is detected using a vehicle speed sensor, or the like. FIG. 5 shows the state that the back-in parking position by the will of the operator corresponds to the determined initial position of the target parking position. When the operators moves the vehicle to the position for starting the parking assist control (i.e., the parking starting position) upon the setting of the initial position of the target parking position, the foregoing designation of the target parking position is conducted by the operator.

Figure 6:
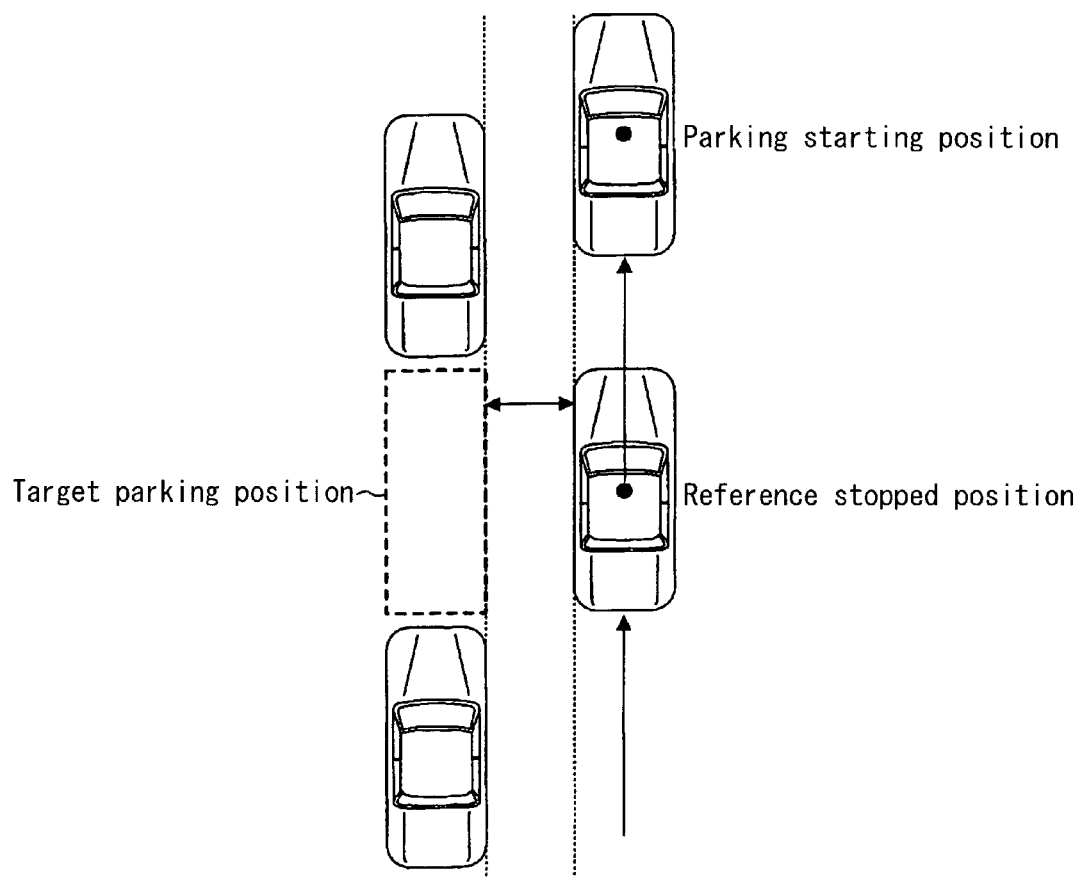
FIG. 6 is an explanatory view for a setting method of an initial position of the target parking position at the parallel parking.

A method for setting the initial position of the target parking position at the parallel parking will be explained with reference to FIG. 6. The operator operates the vehicle in parallel with and to be approximate to the parking position by the parallel parking (i.e., the region surrounded by a dotted line of FIG. 6) and stops the vehicle around the target parking position temporarily. In this case, the position of the temporarily stopped vehicle is determined by adjusting a particular position of the vehicle such as the position of the operator in the vehicle and the rear wheel shaft center, or the like, to the corresponding portion of the desired parking position.

The parking assist ECU 12 determines the initial position of the target parking position to park the vehicle arranged being in parallel with the side of the vehicle keeping a predetermined distance from the vehicle position at the temporarily stopped state (i.e., the reference stopped position) when it is detected that a predetermined switch for requesting the parking assist by the parking assist control is ON state or when it is detected that the vehicle steering angle at the temporarily stopped state is within a predetermined range around the neutral state at the temporarily stopped state of the vehicle is detected using the vehicle speed sensor, or the like. FIG. 6 shows the state that the parallel parking position by the operator's will corresponds to the determined initial position of the target parking position. When the operator moves the vehicle to the position for starting the parking assist control (i.e., the parking starting position) at the state that the initial position of the target parking position is determined, the designation of the target parking position is determined by the operator.

The parking assist ECU 12 calculates the relative positional relationship between the reference stopped position and the parking starting position by calculating the traveling history, that is, the moving amount of the vehicle from the reference stopped position to the parking starting position and calculates the relative positional relationship of the initial position of the target parking position relative to the parking starting position based on the initial position of the target parking position having a predetermined relative positional relationship relative to the reference stopped position, thus to specify the initial position of the target parking position. Thereafter, based on the relative positional relationship of the initial position of the target parking position relative to the parking staring position, the initial display position of the parking space frame S on the screen of the touch display 16 is calculated to initially display the parking space frame S at the calculated position.

With the construction according to the embodiment of the present invention, because the position having the predetermined relative positional relationship with the reference stopped position is determined as the initial position of the target parking position, the parking space frame S showing the target parking position on the screen of the touch display 16 at the parking starting position can be initially displayed approximate to the position corresponding to the desired parking position by the operator from the beginning based on the traveling history of the vehicle from the reference stopped position to the parking starting position in case the operator temporarily stops the vehicle approximate to the position having the predetermined relative positional relationship relative to the desired parking position. Thus, the time for the transaction for adjusting the displacement of the parking space frame S to be adjusted to the desired parking position when the operator designates the target parking position viewing the touch display 16 can be reduced, which reduces the time required for the parking assist control per se.

With the construction that the initial display position of the parking space frame S on the touch display 16 at the starting of the parking assist control is determined by the relative positional relationship between the parking starting position and the initial position of the target parking position, in case the relative positional relationship is within the predetermined range, the position of the parking space frame S on the touch display 16 assumes to be within the display range of the screen to securely initially display the parking space frame S within the screen of the touch display 16. On the other hand, in case the relative positional relationship is not within the predetermined range, in other words, in case the parking starting position in accordance with the moving amount of the vehicle from the reference stopped position is either too far or too close relative to the initial position of the target parking position, the position of the parking space frame S on the touch display 16 at starting the parking assist control assumes to be outside of the display range of the screen, thus not to initially display the parking space frame S on the screen of the touch display 16.

With the construction that the setting screen with the parking space frame S on the touch display 16 appears in case the path to the target parking position whose leading guide of the vehicle by the parking assist control which was once started was cancelled is generated by the calculation to be found after the cancellation and release of the leading guide, the position of the parking space frame S on the touch display 16 at the restart of the parking assist control assumes to be the outside of the display range of the screen, thus not to initially display the parking space frame S within the screen of the touch display 16 in case the parking restarting position at the restart of the parking assist control is largely deviated from the target parking position kept stored in the memory 20 after the cancellation of the leading guide due to the larger moving amount of the vehicle after the cancellation of the leading guide, and in case the parking restarting position is too close relative to the target parking position due to the cancellation of the leading guide despite the approach of the vehicle to the target parking position.

With this regard, in case the parking space frame S showing the target parking position on the touch display 16 is not initially displayed within the screen at starting or restarting the parking assist control, it is required to conduct the positional operation of the parking space frame S to show on the screen although the operator cannot recognize the display position of the parking space frame S on the screen, thus, cannot recognize the target parking position on the road surface. This makes it difficult to designate the target parking position and more time and efforts are required for the designation.

Further, with the construction that the position of the target parking position on the actual road surface is designated by the positional operation of the parking space frame S on the screen at the state that the initial position of the target parking position is preset on the actual road surface and the designation is confirmed by the operation of the confirmation button switch K, the position of the parking space frame S on the touch display 16 may move outside of the display range of the screen upon the movement of the vehicle relative to the target parking position before starting the parking assist control by the confirmation of the designation of the target parking position, and thus the parking space frame S may not be displayed within the screen of the touch display 16.

With the construction that the position of the target parking position on the actual road surface is designated by the positional operation of the parking space frame S on the screen, the position of the parking space frame S on the touch display 16 may move from the display range on the screen to the outside of the display range in accordance with the positional operation upon the shift of the target parking position, thus, the parking space frame S may not be displayed on the screen of the touch display 16.

With this regard, in case the parking space frame S showing the target parking position on the touch display 16 is not displayed within the screen due to the relative movement between the vehicle and the target parking opposition before confirming the designation of the target parking position, the vehicle operator cannot recognize the display position of the parking space frame S on the screens, thus, cannot recognize the target parking position on the road surface. In this case, it assumes difficult to designate the target parking position, which requires the time and efforts for the designation.

With the parking assist device according to the embodiment of the present invention, the foregoing drawbacks are overcome to achieve the designation of the target parking position with a simple operation by the operator. Particularly, with the parking assist device 10, the parking assist ECU 12 grasps the view angle of the captured image determined by the shooting angle range of the camera 14 beforehand, and thus grasps the display region relative to the vehicle on the road surface which is estimated to be shown on the screen of the touch display 16 based on the view angle.

The parking assist ECU 12 determines the display region at the parking starting position (i.e., including the parking restarting position after the leading guide by the parking assist control is cancelled) as the range which is able to be determined as the initial position (i.e., including the position determined as the target parking position immediately before the restart of the parking assist control) of the target parking position (i.e., parking available area). Thereafter, it is judged whether the initial position of the target parking position having the predetermined relative positional relationship relative to the parking starting position calculated at the parking starting position is included within the determined parking available area. Because the size of the target parking position corresponds to the vehicle size, the foregoing judgment is conducted based on either one of the portion corresponding to the corner portion or the central portion of the initial position region of the target parking position, the portion corresponding to the center of the rear wheel shaft portion, and the entire space of the target parking position.

The parking assist ECU 12 initially displays the parking space frame S on the screen of the touch display 16 because the parking space frame S showing the target parking position at the initial position is positioned within the display range in-plane of the screen of the touch display 16 in case the initial position of the target parking position is included within the parking available area as the result of the judgment.

On the other hand, in case the initial position of the target parking position is not included in the parking available area as the result of the judgment, the parking space frame S showing the target parking position at the initial position is not positioned within the display range in-plane of the screen of the touch display 16, the initial position of the target parking position is automatically moved so that the parking space frame S is positioned within the display range to shift the initial display position initially displaying the parking space frame S to the position within the screen of the touch display 16. In this case, the position within the display range for initially displaying parking space frame S may be arranged in the center of the screen of the touch display 16, or may be arranged at the position closest to the position before the shift in the screen considering the easiness of the designation for the target parking position, or the like.

With the foregoing construction, the initial display position of the parking space frame S is shifted to within the display range of the screen so that the operator can see the parking space frame S on the touch display 16 in case that the parking space frame S is not initially displayed within the screen of the touch display 16 at the designation of the target parking position immediately before starting or restarting the parking assist control. In this case, the initial display position of the target paring frame S is limited within the display range of the screen of the touch display 16 irrespective of the relative positional relationship between the parking starting position and the initial position of the target parking position, and the parking space frame S is always displayed on the screen at the designation of the target parking position.

Accordingly, because the operator can recognize the parking space frame S on the screen of the touch display 16 at the designation of the target parking position, it is not required to conduct the positional operation to show the parking space frame S on the screen in case the initial position of the target parking position is not included in the parking available area.

Thus, the designation of the target parking position can be easily achieved by the operator by reducing the operational burden of the operator at the designation of the target parking position, which reduces the time required for the parking assist control pre se.

Figure 7:
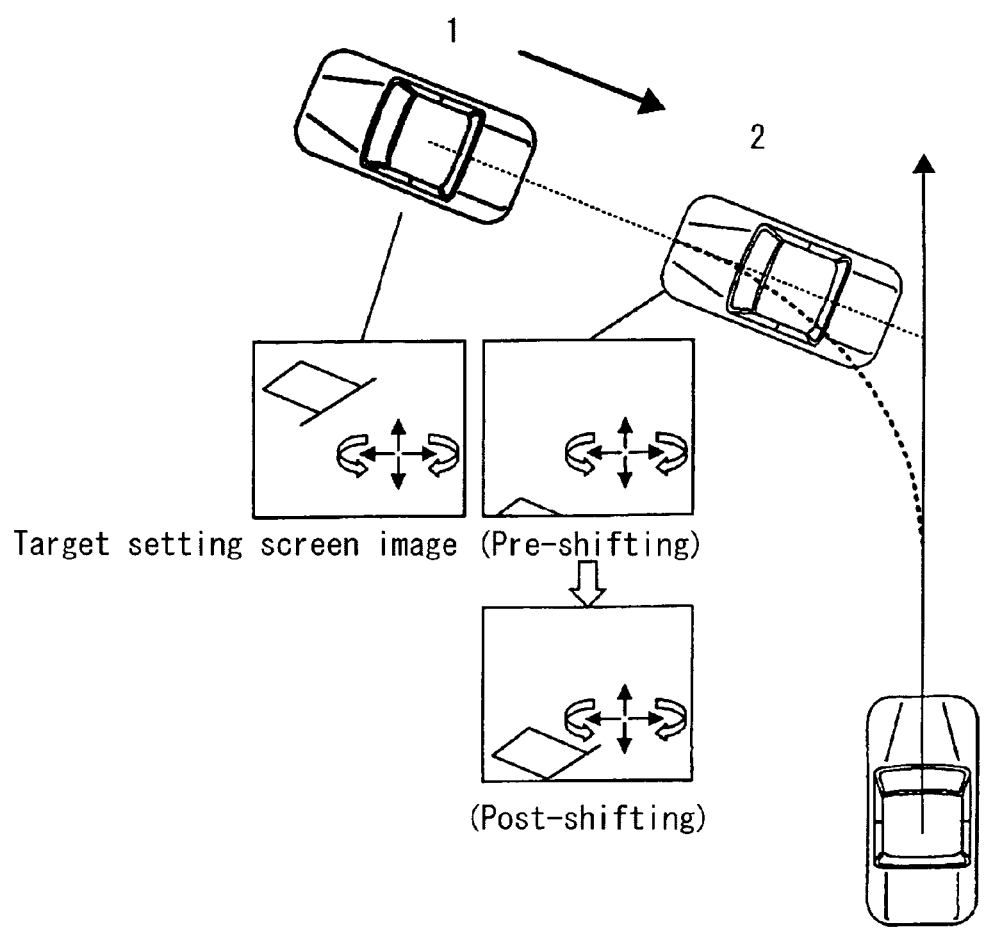
FIG. 7 is an explanatory view for a control method of a display position of a parking space frame on the screen with the parking assist device according to the embodiment of the present invention.

A control method for the display position of the parking space frame S on the screen of the touch display 16 with the parking assist device 10 will be explained with reference to FIG. 7. With the parking assist device 10, the parking assist ECU 12 grasps the display region relative to the vehicle on the road surface estimated to be shown on the screen of the touch display 16 based on the view angle of the captured image determined from the shooting angle range of the camera 14 beforehand.

The parking assist ECU 12 judges whether the target parking position set on the road surface is transited from a state included in the display region relative to the vehicle on the road surface (i.e., shown as 1 in FIG. 7) to a state not included in the display region relative to the vehicle on the road surface (i.e., shown as 2 in FIG. 7) due to the relative movement between the vehicle and the target parking position before confirming the target parking position at the designation of the target parking position. In case the target parking position does not transit to the state not included in the display region, the parking space frame S showing the target parking position is displayed at the position as it is on the screen of the touch display 16 because it is judged that the parking space frame S is kept positioning within the display range on the screen of the touch display 16. On the other hand, in case the target parking position is transited to the state not included in the display region, because it is judged that the parking space frame S as it is positioned outside of the screen of the touch display 16, the target parking position is automatically moved so that the position is not arranged to be outside of the display position (shown as the post shifting in FIG. 7) to limit the movement of the parking space frame S to the outside of the display position.

With the foregoing construction, the display position of the parking space frame S is limited within the display range of the screen in order to make the operator continue recognizing the parking space frame S on the touch screen 16 in case the parking space frame showing the target parking position is not displayed within the screen on the touch display 16 due to the relative movement between the vehicle and the target parking position because of the positional shift of the target paring position or the vehicle movement before confirming the designation of the target parking position. In this case, the parking space frame S is always displayed on the screen irrespective of the relative movement between the vehicle and the target parking position before confirming the designation of the target parking position.

Thus, because the operator can securely recognize the parking space frame S on the screen of the touch display 16 before confirming the designation of the target parking position, it is not required to conduct the positional operation to show the parking space frame S on the screen again even when the target parking position is not included within the display region on the road surface. Accordingly, the designation of the target parking position can be easily achieved by the operator by reducing the operational burden at the designation of the target parking position, which shortens the time required for the parking assist control per se.

Figure 8:
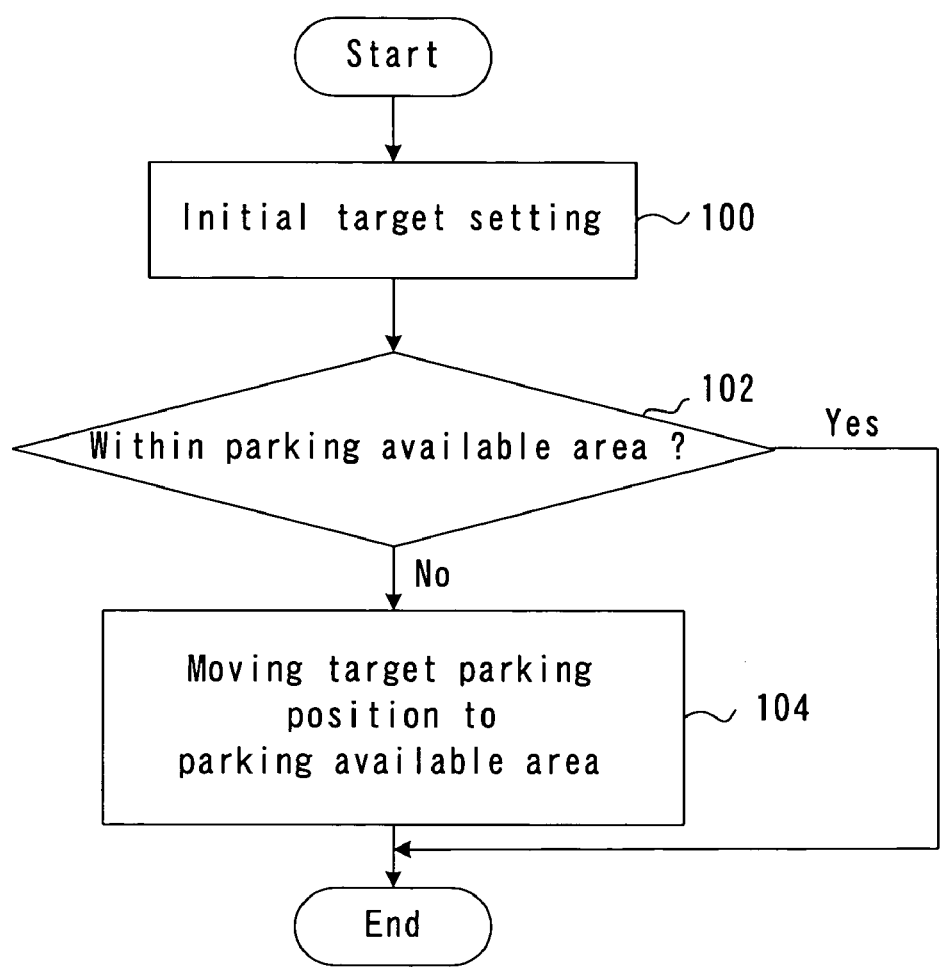
FIG. 8 is a flowchart of a control routine carried out to control an initial display position of the parking space frame on the screen with the parking assist device according to the embodiment of the present invention.

A flow of the control routine carried out by the parking assist ECU 12 for initially positioning the parking space frame S within the display range on the screen of the touch display 16 at the designation of the target parking position will be explained with reference to FIG. 8. The routine shown in FIG. 8 is repeatedly activated upon the completion of the transaction. When the routine shown in FIG. 8 is activated, first, the transaction at Step 100 is carried out.

At Step 100, the transaction for setting the initial position of the target parking position is carried out. The initial position of the target parking position is determined approximate to the desired parking position in case the operator temporarily stops the vehicle approximate to the position where having the predetermined relative positional relationship relative to the desired parking position. In case the path to the target parking position whose leading guide was canceled is generated after the cancellation of the leading guide by the parking assist control started, the initial position of the target parking position is determined at the target parking position whose leading guide was canceled.

At Step 102, it is judged whether the initial position of the target parking position determined at Step 100 is included within the parking available area serving as the display region relative to the vehicle on the road surface at the parking starting position. In case of the positive judgment, the routine is completed without any transaction because it is judged that the parking space frame S showing the target parking position is positioned within the display range at in-plane of the screen of the touch display 16. On the other hand, in case of the negative judgment, the transaction at Step 104 is carried out because it is judged that the parking space frame S is not positioned within the display range at in-plane of the screen of the touch display 16.

At Step 104, the transaction for limiting the initial display position of the parking space frame S within the display range is carried out by shifting the initial display position of the parking space frame S to the position within the display range by moving the initial position of the target parking position. By the transaction at Step 104, the parking space frame S is always initially displayed on the screen at the designation of the target parking position. When the transaction at Step 104 is completed, the routine is completed.

With the routine shown in FIG. 8, the initial display position of the parking space frame S showing the target parking position can be shifted to within the display range of the screen of the touch display 16 by automatically moving the initial position of the target parking position in case the initial position of the target parking position is not included in the parking available area. In this case, the initial display position of the parking space frame S is limited within the display range irrespective of the relative positional relationship between the initial position of the target parking position and the parking starting position, and thus the parking space frame S is always initially displayed on the screen of the touch display 16 at the designation of the target parking position.

With the parking assist device 10, the operator can initially recognize the parking space frame S on the screen of the touch display 16 at the designation for designating the target parking position, and thus the positional operation for showing the parking space frame S on the screen which as conducted to in case the initial position of the target parking position is not included in the parking available area is not required.

Figure 9:
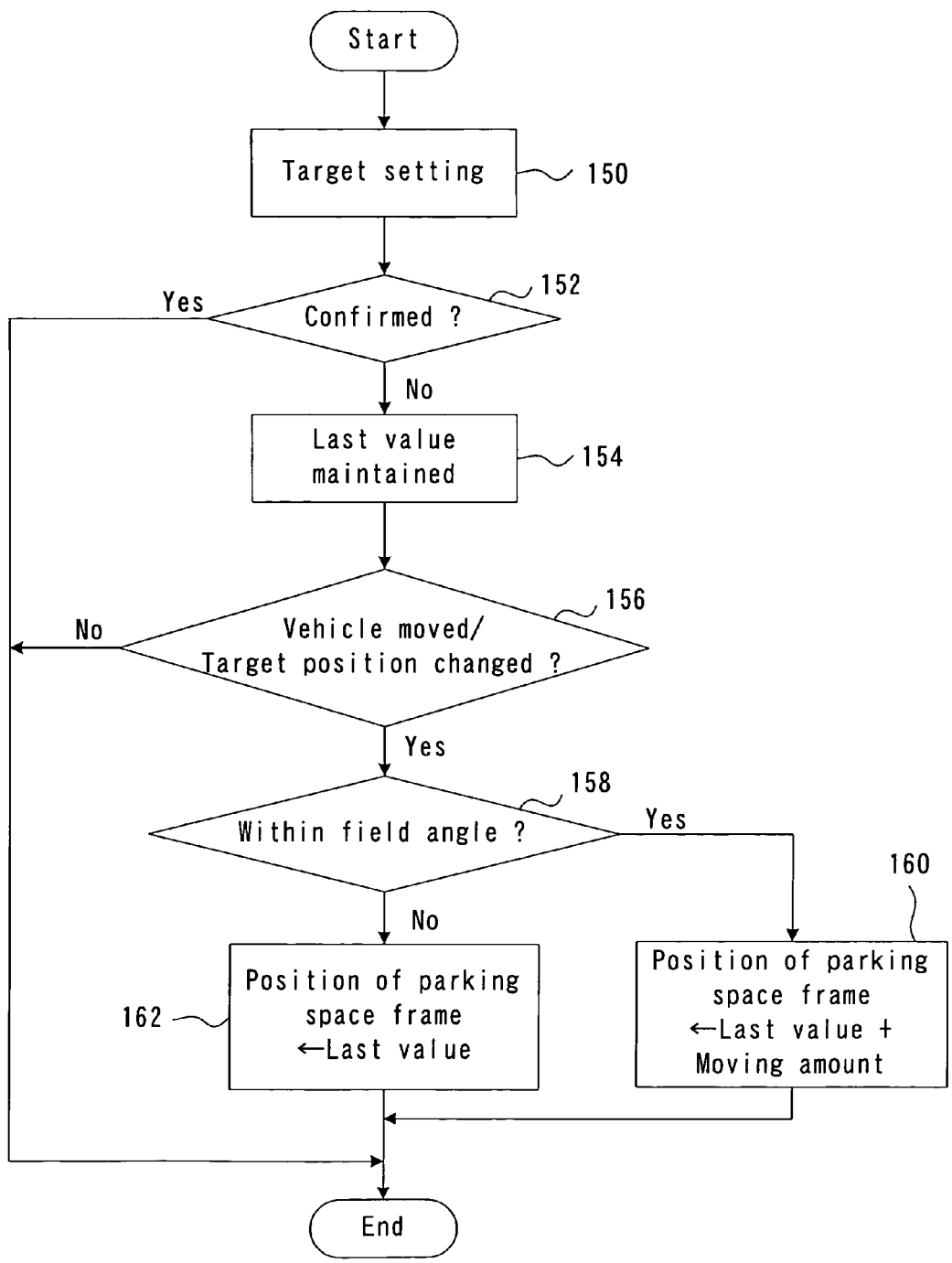
FIG. 9 is a flowchart of a control routine carried out to control a display position of the parking space frame on the screen before confirming the setting of the target parking position with the parking assist device according to the embodiment of the present invention.

A flow of a control routine carried out by the parking assist ECU 12 for controlling the display position of the parking space frame S within the display range on the screen of the touch display 16 before confirming the designation of the target parking position will be explained with reference to FIG. 9 as follows. The routine shown in FIG. 9 is repeatedly activated upon the completion of the transaction. When the routine shown in FIG. 9 is activated, the transaction at Step 150 is carried out.

At Step 150, the transaction for determining the target parking position is carried out. The target parking position is determined on the actual road surface following the positional operation of the parking space S on the screen of the touch display 16 before starting the leading of the vehicle by the parking assist control.

At Step 152, it is judged whether the designation of the target parking position set at Step 150 is confirmed by the operation of the confirmation button switch K. In case it is judged that the designation of the target parking position is confirmed, the routine is completed without any transaction. On the other hand, in case it is judged that the designation of the target parking position is not confirmed, the transaction at Step 154 is carried out to store the display position of the parking space frame S showing the target parking position determined at Step 150 on the screen in the memory.

At Step 156, it is judged whether the vehicle and the target parking position are relatively moved by the positional shift of the target parking position or the vehicle movement. When it is judged that the vehicle and the target parking position are not relatively moved, the routine is completed without any transaction. On the other hand, in case it is judged that the vehicle and the target parking position are relatively moved, the transaction at Step 158 is carried out.

At Step 158, it is judged whether the target parking position after the relative movement between the vehicle and the target parking position is included within the display range relative to the vehicle on the road surface based on the view angle of the captured image by the camera 14. In case of the positive judgment, the transaction at Step 160 is carried out. In case of the negative transaction, the transaction at Step 162 is carried out.

At Step 160, the transaction for moving the display position of the parking space frame S at the screen of the touch display 16 by amount corresponding to the relative moving amount between the target parking position and the vehicle which was judged at Step 156 from the position stored in the memory at Step 154. In this case, because the target parking position after the relative movement is still included within the display region relative to the vehicle, the parking space frame S on the screen of the touch display 16 is continued to be displayed thereafter. When the transaction at Step 160 is completed, the routine is completed.

At Step 162, the transaction for determining the display position of the parking space frame S on the screen of the touch display 16 at the position stored in the memory at Step 154 is carried out. In this case, because the parking space frame S on the screen and the target parking position on the actual road surface are not shifted irrespective of the relative movement between the vehicle and the target parking position, the parking space frame S on the screen of the touch display 16 is continued to be displayed thereafter. When the transaction at Step 162 is completed, the routine is completed.

According to the routine shown in FIG. 9, the display position of the parking space frame S is limited within the display range of the screen by shifting the display position of the parking space frame S to be within the display range by automatically moving the target parking position which has been determined, in case the parking space frame S showing the target parking position is not displayed within the screen on the touch display 16 due to the relative movement between the vehicle and the target parking position before confirming the designation of the target parking position. In this case, the parking space frame S is always displayed on the screen before confirming the designation of the target parking position irrespective of the relative movement between the vehicle and the target parking position.

With the parking assist device 10, the operator can securely recognize the parking space frame S on the screen of the touch display 16 before confirming the designation of the target parking position, and the positional operation to show the parking space frame S on the screen again which was conducted even when the target parking position is not included within the display region is not required.

Thus, with the parking assist device 10, the operational burden of the operator at the designation of the target parking position can be reduced. Thus, the designation of the target parking position can be easily achieved by the operator, which shortens the time required for the operation of the parking assist control per se.

According to the embodiment of the present invention, the parking space frame S serves as a designation display, the transaction of Step 100 by the parking assist ECU 12 serves as an initial position setting means, calculating the initial display position of the parking space frame S on the touch display 16 corresponding to the initial position of the determined target parking position serves as a display position calculation means, and the transaction at Step 104 serves as an initial display position shifting means and a calculated position limiting means.

According to the embodiment of the present invention, the transaction at Step 150 carried out by the parking assist ECU 12 serves as a target parking position setting means, calculating the display position of the parking space frame S on the touch displayed 16 corresponding to the determined target parking position serves as a display position calculation means, and the transaction at Step 162 serves as a display position movement limiting means.

Although only the steering operation is automatically conducted using the electric motor of the EPS 18 as the parking assist control for moving the vehicle to the target parking position along the path in the embodiment of the present invention, the present invention is not limited, and the actuation and stop of the vehicle may be automatically conducted without the manual operation by the operator. Further, the operation by the operator may be assisted by the voice guidance and the additional lines on the touch display 16, or the like.

Although the transaction for designating the target parking position is reduced by avoiding that the parking space frame S is not displayed within the screen of the touch display 16 when designating the target parking position and conforming the designation of the target parking position according to the embodiment of the present invention, the transaction for designating the target parking position may also be reduced by the following.

When the display position of the parking space frame S displayed within the screen of the touch display 16 is positioned approximate to the top end portion of the screen due to the longer distance from the reference stopped position to the parking starting position or due to the longer relative moving distance between the vehicle and the target parking position, it is required to approximate the target parking position to the vehicle considering that, generally, the distance from the parking starting position to the target parking position is approximately 5-8 meters. Thus, in case the distance between the vehicle and the initial position of the target parking position is longer than a predetermined threshold even when the initial position of the target parking position is included in the parking available area corresponding to the display region relative to the vehicle on the road surface at the parking starting position, the initial display position of the parking space frame S may be shifted to the bottom portion of the display range on the screen of the touch display 16. Further, in case the distance between the vehicle and the target parking position assumes longer than a predetermined threshold, the target parking position may be automatically moved to approach the vehicle to limit the movement of the display position of the parking space frame S to the top portion of the display range on the screen of the touch display 16 even when the target parking position is included within the display region relative to the vehicle on the road surface.

Whether the initial display position of the parking space frame S is positioned within the display range on the screen of the display 16 is judged by the absolute coordinate system having the road surface as the reference based on whether the initial position of the target parking position is included within the display region relative to the vehicle captured by the camera 14 at the parking starting position according to the embodiment of the present invention. And also, whether the display position of the parking space frame S is positioned within the screen of the touch display 16 is judged by the absolute coordinate system having the road surface as the reference based on whether the target parking position is included within the display region relative to the vehicle according to the embodiment of the present invention. For both cases, the judgment may be conducted by a camera coordinate system having the position of the camera 14 as the reference by converting the coordinates.

The construction that the initial position of the target parking position is set on the absolute coordinate on the road surface irrespective of the parking starting position beforehand, and the initial display position of the parking space frame S on the touch display 16 at the start of the parking assist control is determined based on the relative positional relationship between the parking starting position and the initial position of the target parking position in order to reduce the transaction for designating the target parking position by reducing the necessity for adjusting the displacement of the parking space frame S is adopted according to the embodiment of the present invention. However, with the adoption of the construction that the re-designation of the target parking position is conducted having the target parking position whose leading guide was canceled as the initial position after the cancellation of the vehicle leading guide by the parking assist control started, in case avoiding the state that the parking space frame S showing the target parking position is not initially displayed on the screen of the touch display 16 at the restart of the parking assist control is the purpose, the initial display position of the parking space frame S on the touch display 16 may be determined to be fixed by determining that the initial position of the target parking position has a predetermined relative positional relationship relative to the parking starting position at the start of the parking assist control.

According to the embodiment of the present invention, in case the initial display position of the designation display showing the target parking position determined with the initial position on the screen assumes outside of the screen, the initial display position is shifted to the position within the display range on the screen. Because the designation display showing the target parking position is always displayed on the screen at the initial state, the operator can recognize the designation display of the target parking position on the screen from the beginning for designating the target parking position.

According to the embodiment of the present invention, the initial display position of the designation display showing the target parking position determined with the initial position on the screen is limited within the display range of the screen. Because the designation display showing the target parking position is always displayed on the screen at the initial stage, the operator can recognize the designation display of the target parking position on the screen from the beginning for designating the target parking position.

According to the embodiment of the present invention, the positional movement of the designation display is limited so that the display position of the designation display showing the target parking position on the screen is not to be outside of the screen before starting the parking assist by confirming the setting of the target parking position. Because the designation display showing the target parking position is always displayed on the screen in this case, the operator can securely recognize the designation display of the target parking position on the screen before confirming the designation of the target parking position. Accordingly, the operator can easily achieve the designation of the target parking position.

According to the embodiment of the present invention, the initial position of the target parking position is initially predetermined as the target parking position before starting the parking assist by the will and the intention of the operator and corresponds to the position which is changeable as the target parking position.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assist device which starts to assist parking operation after confirming a target parking position comprising:
   a target parking position setting means for setting the target parking position to park a vehicle;
   a display for displaying a designation display indicating the target parking position at a screen showing vehicle surroundings;
   a display position calculation means for calculating a display position of the designation display at a screen based on the target parking position determined by the target parking position setting means; and
   a display position movement limiting means for limiting positional movement of the designation display so as not to position the display position calculated by the display position calculation means outside of a display range of the screen upon relative movement between a position of a vehicle and the target parking position determined by the target parking position setting means and judgment that the target parking position is outside of the display range before confirming the setting of the target parking position to start to assist the parking operation.

2. A parking assist device according to claim 1, wherein the display position calculation means calculates the initial display position or the display position based on a vehicle traveling history from the setting of the target parking position by the target parking position setting means or from the setting of the initial position by the initial position setting means.

* * * * *

UNITED STATES PATENT AND TRADEMARK OFFICE
CERTIFICATE OF CORRECTION

PATENT NO.       : 7,599,773 B2                                       Page 1 of 1
APPLICATION NO.  : 10/928256
DATED            : October 6, 2009
INVENTOR(S)      : Tanaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this

Twenty-eighth Day of September, 2010

David J. Kappos
*Director of the United States Patent and Trademark Office*